United States Patent [19]

Gehrmann

[11] 4,325,396
[45] Apr. 20, 1982

[54] APPARATUS FOR CLEANING A FILTER PRESS

[75] Inventor: Gerd-Peter Gehrmann, Gerlafingen, Switzerland

[73] Assignee: Von Roll AG, Switzerland

[21] Appl. No.: 165,183

[22] Filed: Jul. 1, 1980

[30] Foreign Application Priority Data

Jul. 9, 1979 [CH] Switzerland .................. 6389/79

[51] Int. Cl.³ .............................................. B08B 3/02
[52] U.S. Cl. ...................................... 134/181; 239/185
[58] Field of Search ....................... 134/172, 180–181, 134/198; 239/185

[56] References Cited

U.S. PATENT DOCUMENTS 3,780,747 12/1973 Stadie et al. ................... 134/172 X
4,129,137 12/1978 Kurita et al. .................. 134/172 X

FOREIGN PATENT DOCUMENTS 6516120 12/1965 Netherlands ....................... 134/172

Primary Examiner—Robert L. Bleutge

[57] ABSTRACT

A support is mounted above a filter press for movement along the longitudinal axis of the press. A trolley is mounted on the support for reciprocal movement transversely to the axis of the press, from one side to another. A standpipe is mounted on the trolley to swing between a horizontal position and a vertical position. A single drive system is provided, interconnecting the trolley and the standpipe, which sequentially swings the standpipe from the horizontal to the vertical position, moves the trolley from one side to the other of the filter press, and thereafter reverses the movement of the trolley and the swinging of the standpipe.

11 Claims, 5 Drawing Figures

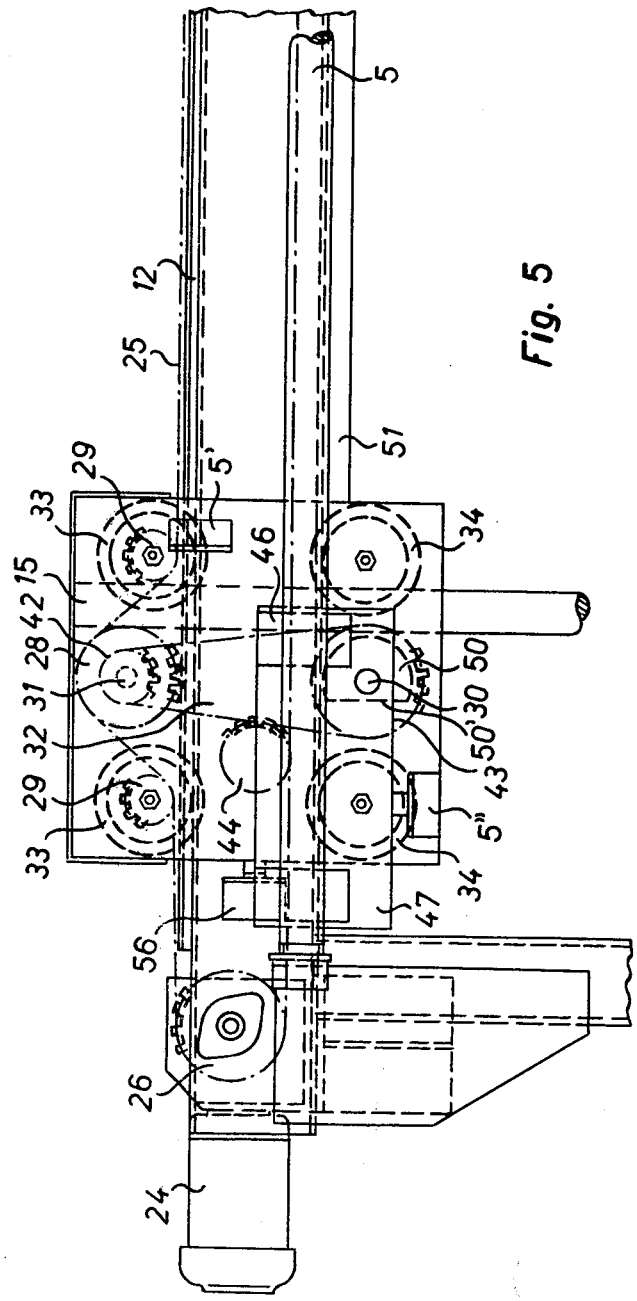

APPARATUS FOR CLEANING A FILTER PRESS

BACKGROUND OF THE INVENTION

The present invention relates to apparatus for cleaning and washing the filter plates and filter cloths of a filter press.

In general, a filter press comprises a plurality of rectangular plates, covered with a filter cloth arranged in side-by-side abutting pressure contact, through which the liquid to be filtered is passed in serpentine fashion, axially through the plurality of plates. Since the filtrates accumulate on the filter cloths, they must be cleaned. This is generally accomplished by separating the plates, and spraying the separated plates with a pressurized washing fluid.

Various constructions of apparatus for washing the plates are known. In one such construction, shown in German patent publication No. DAS-21 19 295, a horizontal spray pipe is moved by means of a hoist, employing, for example, an hydraulic or pneumatic cylinder, along the filter plate, which is maintained at a right angle to the position of the spray pipe. The hoist can be positioned above or below the filter press. The disadvantage of using either hydraulic or pneumatic hoists of this type lies in the fact that the stroke of the cylinder must be at least equal to the height of the filter press. This requires a great deal of space, which is often not available.

In another construction, shown in the Swiss Pat. No. 6,021,058, the spray pipe is mounted on a trolley which is movable over the filter press. In the inoperative position, the spray pipe is swung out of the area of the filter plate, so as not to interfere with its closing. In the operative position, the spray pipe is rotated by 90°, so as to present itself in a proper position for cleaning. The spray pipe is moved by the trolley along the filter plate. This construction is relatively complicated, since it requires three drive motors. One motor is used to swing the spray pipe from the inoperative position, by 90°, into the operative position. The second motor is employed to move the trolley from the initial position into its end position and back again. The motor employed for swiveling the spray pipe, which is arranged on the trolley itself, requires a movable energy supply, and is thus subject to much fault and down time. Finally, the third motor is used to effect the longitudinal displacement of the spray pipe when it is in its inoperative position.

The object of the present invention is to provide a more simplified apparatus which is both easy to construct, and simple to use in operation. In particular, it is an object of the present invention to provide for the swiveling of the spray pipe from its inoperative to operative position without the need for a separate motor, and/or energy supply system mounted on the trolley itself.

The foregoing objects, and other objects, are set forth in the following disclosure.

SUMMARY OF THE INVENTION

According to the present invention, the apparatus for cleaning the plates of a filter press comprises a support mounted above the press for movement along the longitudinal axis of the press. A trolley is mounted on the support for reciprocal movement transversely to the axis of the press, from one side to another. A standpipe is mounted on the trolley to swing between a horizontal position and a vertical position. A single drive system is provided, interconnecting the trolley and the standpipe, which sequentially swings the standpipe from the horizontal to the vertical position, moves the trolley from one side to the other of the filter press, and thereafter reverses the movement of the trolley and the swinging of the standpipe.

Full details of the present invention are set forth in the accompanying description of the preferred embodiments and are shown in the accompanying drawings.

BRIEF DESCRIPTION OF THE DRAWINGS

In the drawings:

FIG. 5 is an enlarged side view of the trolley of the washing apparatus.

DESCRIPTION OF THE INVENTION

Figures 1, 2, 3, 4:
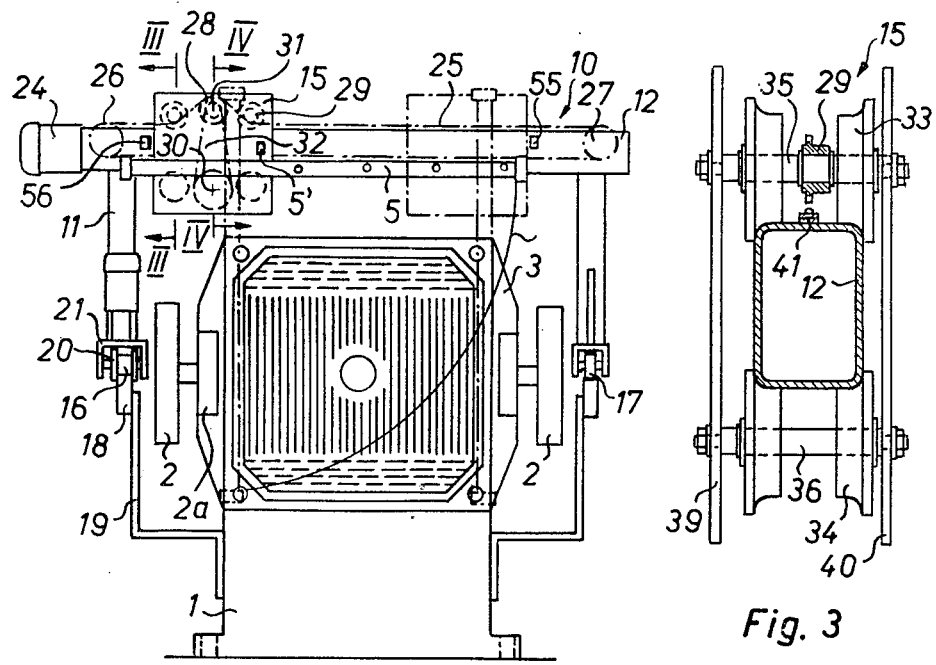
FIG. 1 is a vertical section through a conventional filter press showing the washing apparatus for the filter plates in accordance with the present invention.
FIG. 2 is a diagrammatic showing, in side view, of a portion of the filter press shown in FIG. 1, looking at the press from the right of FIG. 1, so as to illustrate the action of the washing apparatus.
FIG. 3 is an enlarged section through the trolley of the washing apparatus, taken along lines III—III of FIG. 1.
FIG. 4 is an enlarged section through the trolley of the washing apparatus taken along lines IV—IV of FIG. 1.

The filter press is conventionally formed at one frontal face with a fixed end plate 1, as seen in FIGS. 1 and 2, and at the opposite frontal face with a movable end plate (not shown) which is supported on a yoke (also not shown). The fixed end plate 1 is connected to the yoke by two longitudinal struts 1, which run along the side of the filter press. Between the fixed and movable end plates, there is provided a plurality of filter plates 3, which are slidably supported on the rails 2a, secured to the struts 2. Covering each of the filter frames is a cloth filter member (not shown) through which the liquid to be cleaned passes and on which is deposited the filtrate.

During operation, the not shown movable end plate closes towards the fixed end plate, pressing the filter plates together, and the liquid to be cleaned is fed in the longitudinal direction in one end, through a serpentine path through the plates and cloths, and out of the other end, leaving the residue of filtrates on the cloths.

Periodically, the filter plates and the cloth filter members are required to be cleaned. To effect this, the movable end plate is opened so that, as seen in FIG. 2, the individual filter frames 3 are capable of being successively displaced from each other, leading to the formation of a gap 4 between each successive pair of filter plates.

A standpipe 5, having a plurality of nozzles 6, and connected to a source of cleaning liquid, is then moved through the gap 4 transversely to the longitudinal axis, between each of the spaced pairs of filter frames 3. The cleaning liquid is discharged under high pressure so that the filter cloths can be cleaned. Each of the filter frames and their associated cloths are cleaned successively, one filter frame being moved after another until all filter cloths are cleaned and the filter press is closed again.

The apparatus for cleaning the filter cloths according to the present invention, is generally depicted by the numeral 10, and comprises a rectangular gantry comprising a vertical support 11 on each of the sides of the press, to which is connected a transverse, horizontal support 12. The supports 11 and 12 are preferably formed of hollow, rectangular pipes or channel members for strength and minimum weight. Movably mounted on the horizontal support is a trolley 15, on which the standpipe 5 is pivotally mounted, so as to swing between a horizontal position shown in solid lines, and a vertical position shown in the dot-dash lines of FIG. 1, and as illustrated by the arc A.

The vertical supports 11 are mounted on an elongated bracket 21, in each of which a pair of rollers 16, and a pair of rollers 17, are respectively journalled. The rollers ride on a horizontal rail 18, extending along the opposite sides of the press in the longitudinal direction. The rails 18 are supported on frame members 19, secured to the base or ground support of the press. The rollers 16 and 17 are mounted on axles fixed in the elongated bracket 21, which has a U-shaped cross-section. The wheels 16 are provided with flanges 20 on each of their sides, so as to prevent lateral displacement of the gantry, while the wheels 17 are not formed with such flanges, although they might be if desired.

The gantry is thus movable from the front to rear frontal faces, in a longitudinal direction relative to the press along the rail 18. To effect this, an endless chain transmission 22, actuated by a reversible motor 23, is provided. The motor may be electrical or hydraulic, and may be simply mounted upon the bracket 21, above the wheels 16. The output shaft of the motor 23 is connected by suitable gearing to a chain and sprocket transmission, whereby the wheels 16 may be rotated.

As seen in FIGS. 1, 3, 4 and 5, the trolley comprises two upper pairs of bogies 33 and two lower pairs of bogies 34, each pair having flanged wheels which engage the respective edges of the support 12, the upper bogies 33 being respectively mounted about freely-rotatable axles 35, the lower bogies being mounted about freely-rotatable axles 36, both sets of axles being journalled transversely, in a rectangular array, between vertical wall members 39 and 40.

Journalled, in suitable bearing mounts, between the lower bogie axles 36, is a freely-rotatable swivel shaft 30 on one end of which the standpipe 5 is mounted, in offset or eccentric bell-crank fashion, so as to have a long portion extending therefrom which continuously exerts a turning moment in the clockwise direction. To effect this, the standpipe 5 is welded or otherwise secured to two support plates 46, which are themselves fixedy connected to a base plate 47, which is welded to the swivel shaft 30. Located at one end of the horizontal support 12, is a reversible motor 24 (electrical or hydraulic), the output shaft of which is connected to a suitable transmission to drive an endless chain 25 about spaced sprocket wheels 26 and 27, journalled at each end of the support 12.

The chain 25 passes over a drive sprocket 28, fixed on a freely-rotatable axle 31, journalled in bearings 45 mounted on the walls 39 and 40, between the upper bogie axles 35. The chain 25 simultaneously passes over guide sprockets 29, freely rotatably mounted about each of the shafts 35, between the respective bogie pairs 33.

Connection between the drive shaft 31, and the swivel shaft 30 is effected by an endless chain 32, entrained about a pinion sprocket 42, fixedly mounted on the shaft 31, and an enlarged sprocket wheel 43, fixedly mounted on the swivel shaft 30, and passing over an adjustable tensioning sprocket 44. It is to be noted that the relative sizes of the pinion 42 and sprocket 43 are chosen, so that a relatively small rotation of the axle 31 will be translated into a larger angular rotation of the swivel shaft 30.

Mounted on the top of the horizontal support member 12 is a guide 41, which cooperates with the sprocket wheels 28 and 29, to maintain the chain 25, in alignment along the support 12.

A micro-switch 55, or other sensing device, is mounted on the horizontal support 12 at the end thereof, adjacent the sprocket wheel 27. This sensor acts as a limit switch, determining the traverse of the trolley from an initial position on the left side to a fully extended position on the right side. The switch is connected to the reversible motor 24, so as to reverse the drive thereof. At the initial end of the horizontal support, there is provided a fixed stop-member 56, which limits the leftward movement of the trolley 15. Mounted on the exterior of the trolley is a fixed stop member 5', which engages the standpipe 5, and limits its movement upwards so that it lodges in the horizontal direction, as shown in FIG. 1, as well as limiting its downward swinging movement into the vertical direction as shown in FIG. 2.

Fixed about the center of the swivel shaft 30 is a cam body 50 (see FIG. 5), which when the standpipe 5 is positioned horizontally, assumes an "inoperative" position and when positioned vertically, assumes an "operative" position. In the "operative" position, the cam body 50 cooperates with a guide rail 51, see FIG. 4 and especially FIG. 5, which is arranged on the bottom of the horizontal support 12. The guide rail 51 extends from a position approximately to the right of the swivel shaft 30, when the trolley is located in the full line position of FIG. 1, towards the end of the support at about the position of the micro-switch 55. Thus, there is no guide rail in the rest position of the trolley as assumed in FIG. 1. During this engagement of the cam body 50 and rail 51, the swiveling of the standpipe 5 is prevented. The guide rail 51 is not seen in FIG. 1, since it lies behind the visible portion of the horizontal standpipe 5.

The swivel shaft 30 is provided at its end opposite that of the standpipe, with a lever 53, having fixed to it a counter-weight 52, the weight being so offset that it enhances the biasing turning moment of the standpipe 5.

From the foregoing, it will be observed that operation of the motor 23 will cause the gantry to reciprocally move along the rails 18 from one end to the other of the filter press, while operation of the motor 24 will cause the trolley 15 to traverse the filter press, normal to its longitudinal axis, while simultaneously causing the swiveling movement of the standpipe 5, so that the washing of the filter cloths as previously indicated can be effected.

The fixed stop member 56 can be replaced with a micro-switch, so that interlocking between motors 23 and 24 can be effected automatically.

In operation, as the filter press is opened, the gantry is placed, so that the vertical supports 11 lie within the gap 4 formed between the displaced filter plates 3. Motor 24 is then switched on, and the chain drive 25 is moved in clockwise rotation. As the biasing turning moment of the standpipe 5 also acts in the clockwise direction, the force of this turning moment causes the swivel shaft 30 to rotate the chain 32 clockwise. Since both the chain 32 and the chain 25 move in the clockwise direction, the standpipe 5 swivels to assume the vertical position, without movement of the trolley 15, since the axle 31 on which the sprocket wheel 28 is fixed tends to free-wheel in its bearings. (Note that the body 50 and rails 51 are not in engagement at this point).

In the vertical position, the standpipe is limited by the fixed stop 5'. Once this occurs, the driving sprocket 28 becomes locked, due to the fact that the chain 32 can no longer rotate. When this occurs, the movement of the chain 25, relative to the driving sprocket 28, which now acts as a fixed driving cog, causes the trolley to move along the support 12. The trolley then moves until it engages the limit switch 55, which causes the motor 25 to reverse itself. On reversal of the motor 24, the chain 25 is caused to rotate in a counter-clockwise direction. As the torque exerted in the clockwise direction by the standpipe 5 is greater than the frictional torque acting in the counter-clockwise direction provided by the cooperation of the trolley 15 and the drive sprocket 28, the drive sprocket 28 continues to act as a fixed driving cog, causing the trolley to travel in the return direction to its initial position, until it abuts against the stop 56. The counter-clockwise torque is caused primarily by the weight of the offset standpipe and the counter-weight 52. The interaction of lever 50 and rail 51 insures that the standpipe does not swivel during the return moment.

As the trolley can travel no further than limit stop 56, the action of the chain 25 on the drive sprocket 28 then becomes so great that it causes the sprocket axle 31, and chain 32, to rotate in a counter-clockwise direction, thus overcoming the weight of the standpipe 5 and swiveling the swivel shaft 30 and standpipe 5 into its horizontal rest position to a fixed stop 5" (FIG. 5).

Since the positive locking brought about by the cam lever 50, in cooperation with the guide rail 51, is effective only along the portion of the support 12, outside the initial position of the trolley 15, i.e., when the standpipe 5 is to be in its vertical position, any increase above the normal level of torque operating on the driving sprocket 28, will be ineffective to cause premature swiveling of the standpipe 5 from the vertical to the horizontal position. Thus, the standpipe 5 can only be placed in the horizontal position upon completion of the return travel of the trolley 15, and its abutment against the fixed stop 56. Generally, because of the weight of the standpipe, and its counter-weight 52, the positive locking means, such as lever 50 and rail 51, as described, may not be necessary in most cases.

After the return of the trolley 15 into its original or initial position, and the swiveling of the standpipe 5 into the horizontal, inoperative position, the standpipe 5 can engage a further limit switch (not shown) so as to de-activate the motor 24. This limit switch can also operate automatic control means, by which the next filter plate is moved, a new gap be formed, and the washing cycle re-started.

While the transmission means is shown as chain and sprocket systems, it will be apparent that the equivalent structure in a belt and pulley system can be used without any modification. Further, in lieu of either the chain and sprocket, or belt and pulley systems, the transmission may be in the form of an intermediary gear train. Particularly, the reduction chain and sprocket system interconnecting the swivel shaft 30 and drive axle 31 can be replaced with a gear reduction train.

It is also possible to mount the standpipe directly on the drive axle for the same effect.

What is claimed is:

1. Apparatus for cleaning the plates of a filter press, comprising a support mounted above said press for movement along the longitudinal axis of said press, a trolley mounted on said support for reciprocal movement transversely to the axis of the press from one side to the other, a standpipe mounted on said trolley to swing between a horizontal position and a vertical position, and a unitary drive system for sequentially swinging said standpipe from said horizontal to said vertical position and for moving said trolley from said one side to the other and thereafter reversing the movement of said trolley and the swinging of said standpipe, said standpipe being mounted on a freely-swivelable shaft, journalled in said trolley to be normally dependent from the horizontal position, and said drive system including a motor and a transmission comprising first means mounted on said trolley coupled to said motor for idling therewith, and second means responsive to the displacement of said standpipe from the horizontal position, for securing said first means against idling, said first and second means being cooperable on the movement of said motor, in one direction, to permit said standpipe to be displaced into its vertical position and thereafter on securement of said first means to move said trolley across said support and on the movement of said motor, in the other direction, to maintain said first means secure—to reverse said trolley and thereafter to displace said standpipe in its horizontal position.

2. The apparatus according to claim 1, wherein said first means comprises a first wheel freely-rotatably mounted on said trolley and coupled to said motor by an endless drive member.

3. The apparatus according to claim 2, wherein said second means comprises second and third wheels fixed to said first wheel and said swivelable shaft, respectively, for conjoint rotation therewith, and an endless drive member entrained over said second and third wheels.

4. The apparatus according to claims 1 or 2, wherein said wheels and drive members are formed of pulleys and belts.

5. The apparatus according to claims 1 or 2, wherein said wheels and drive members are formed of sprocket wheels and chains.

6. The apparatus according to claim 1, wherein said first wheel is mounted on said swivel shaft.

7. The apparatus according to claim 1, including means for guiding said endless drive member.

8. The apparatus according to claim 1, including means for locking said standpipe against displacement from a vertical position when said trolley is in movement.

9. The apparatus according to claim 1, including means mounted on said trolley for limiting the movement of said standpipe.

10. The apparatus according to claim 1, including means mounted on said horizontal support for limiting the movement of said trolley therealong.

11. The apparatus according to claim 1, including a gantry supporting said horizontal support, and means for moving said gantry in the longitudinal direction of said press.

* * * * *